United States Patent [19]

Fox, deceased et al.

[11] Patent Number: 5,133,424
[45] Date of Patent: Jul. 28, 1992

[54] VARIABLE ASSIST POWER STEERING CONTROL VALVE

[75] Inventors: Clarence D. Fox, deceased, late of Westland, Mich.; Rosamond L. Fox, Executrix, Decatur, Ill.; Richard W. Dymond, Rochester, Mich.

[73] Assignee: Borg-Warner Automotive Electronic & Mechanical Systems Corporation, Sterling Heights, Mich.

[21] Appl. No.: 691,476

[22] Filed: Apr. 25, 1991

[51] Int. Cl.⁵ .......................................... B62D 5/06
[52] U.S. Cl. ................................. 180/132; 91/31; 251/129.07; 137/874
[58] Field of Search ............. 180/132; 251/129.07; 137/872, 874; 91/31

[56] References Cited

U.S. PATENT DOCUMENTS

| 4,318,333 | 3/1982 | Cemenska | 91/31 |
| 4,400,938 | 8/1983 | Ohe | 91/31 |
| 4,420,934 | 12/1983 | Udono | 91/31 |
| 4,570,735 | 2/1986 | Duffy . | |
| 4,570,736 | 2/1986 | Waldorf . | |

FOREIGN PATENT DOCUMENTS 3701271 8/1987 Fed. Rep. of Germany ...... 180/132

OTHER PUBLICATIONS

SAE Paper entitled: "1988 Lincoln Continental Variable-Assist Power Steering System"–J. J. Duffy.

*Primary Examiner*—H. Grant Skaggs
*Attorney, Agent, or Firm*—Willian Brinks Olds et al.

[57] ABSTRACT

A variable assist power steering system for an automotive vehicle, the system having a source of hydraulic fluid (10), a power steering assembly (30) having a low speed inlet (32) and a high speed inlet (34), and a control valve (50) for continuously delivering hydraulic fluid to the low speed inlet and for delivering fluid to the high speed inlet only at vehicle speeds above a predetermined level. The control valve has an annular spool (64) which moves freely within a cylindrical housing (52), and it has a second spool (74) which is caused to move linearly by a solenoid (86) which acts on the one end thereof and a spring (88) which acts on the other end thereof. The second spool has a central portion (76) which is positioned within the annular spool and which defines an annular passage (68) therewith. The second spool further has enlarged end portions (78, 80) positioned outside of the ends of the annular spool to permit fluid to flow into the annular passage from each end. Energization of the second spool by the solenoid, which is accomplished in response to vehicle speed by speed responsive control devices (120, 130), will cause the annular spool to move with the second spool to maintain substantially balanced hydraulic flow into the annular passage from each of its ends. The annular spool has a flow path (66, 70) which communicates with the low speed inlet in both the solenoid energized and solenoid de-energized positions of the second spool, and a flow path (72) which communicates with the high speed inlet only in the solenoid de-energized position of the second spool.

11 Claims, 2 Drawing Sheets

VARIABLE ASSIST POWER STEERING CONTROL VALVE

TECHNICAL FIELD

This invention relates to a solenoid actuated hydraulic valve of the spool type for controlling the operation of a variable assist power steering system in an automotive vehicle.

BACKGROUND OF THE INVENTION

U.S. Pat. Nos. 4,570,735 (Duffy) and 4,570,736 (Waldorf) disclose variable assist power steering systems for automotive vehicles. Each of these systems incorporates a hydraulically operated power steering valve assembly which receives hydraulic fluid from a source. The valve assembly provides a greater steering assist when the vehicle is parked or travelling at low speed than when it is travelling at high speed. Speed sensitive valving or switching is provided to control the delivery of hydraulic fluid from the source to the valve assembly to thereby achieve the desired speed related variable assist feature. The valving and switching techniques of the foregoing systems are complex, and therefore costly and subject to reliability problems. Further, it is known that stepping motor linear actuators have been employed to control the flow of hydraulic fluid to variable assist power steering valve assemblies because of the problems associated with the control systems of the foregoing patents. Such a system is described in an SAE paper entitled "1988 Lincoln Continental Variable Assist Power Steering System" (J. J. Duffy). However, stepper motor systems are rather large and costly and they require complex control electronics. Further, when any stepper motor system fails, it will remain in the operating state it was in at the time of failure, which is not an inherently failsafe failure mode.

DISCLOSURE OF THE INVENTION

According to the present invention there is provided a vehicle speed controlled, solenoid-operated, spring biased, spool type valve for controlling the flow of hydraulic fluid to a variable output valve assembly of an automotive vehicle, for example, a power steering valve assembly of the type generally identified by reference numeral 10 in the aforesaid U.S. Pat. No. 4,570,736. Such a power steering valve assembly has two sets of inlets, a set which always receives hydraulic fluid, frequently called the parking or low speed inlets, and a set which only receives hydraulic fluid when the vehicle operating conditions are suitable, as determined by the power steering control system, for example, when the vehicle is travelling at or above a predetermined speed. Thus, the second inlets are frequently called the high speed inlets.

The control valve according to the present invention provides hydraulic fluid to the low speed and high speed inlets of a variable assist power steering valve assembly and may be used with any hydraulic steering system valve assembly, rotary or linear, which has dual hydraulic fluid inlet(s). The control valve is made up of a cylindrical valve body with a free floating annular spool element which is positioned in the valve body and which is capable of moving to and fro within the valve body. The annular spool has a first groove in its outer surface which provides for hydraulic communication between a first inlet line from the hydraulic supply into the control valve body and the low speed inlets of the power steering valve assembly. The first groove has substantial axial length, and is in fluid communication with the low speed inlets at all positions of the annular spool within its limits of travel. The annular spool further has a second groove which is in fluid communication with the high speed inlets in one position of the annular spool and is out of communication with the high speed inlets in another position of the annular spool.

The control valve further includes a solenoid actuated spool within the annulus of the annular spool. The solenoid actuated spool has a reduced diameter central portion which defines an annular flow passage for hydraulic fluid with the inside of the annular spool. The solenoid actuated spool further has enlarged portions positioned outside of the opposed ends of the annular spool. Each of the enlarged portions is larger than the adjacent opening of the annular spool, and the spacing between the enlarged portions is slightly greater than the axial length of the annular spool, thus permitting hydraulic fluid within the housing of the control valve to flow into each of the opposed ends of the annular spool.

The solenoid actuated spool has an extension which extends beyond one of the enlarged portions, and the extension carries an enlarged portion which is closely surrounded by an annular solenoid. Energization of the solenoid is controlled in response to vehicle speed below a predetermined maximum, and/or other vehicle operating conditions, and when the solenoid is actuated the solenoid actuated spool is driven linearly toward the opposed end of the valve body. This motion of the solenoid actuated spool will result in a corresponding motion of the annular spool as it moves to maintain substantially equal hydraulic pressures at each of the opposed ends of the annular flow path, and therefore substantially equal flow rates into the opposed ends of the annular flow path. The opposed end of the solenoid actuated spool is acted on by a compression spring which ensures the return of the solenoid actuated spool, and thereby the annular spool, to the positions which they occupy when the solenoid is not energized. The spring return feature of the control valve provides a fail safe feature by ensuring that the annular valve will maintain the flow of hydraulic fluid to the high speed inlets of the power steering valve assembly whenever there is a failure of the solenoid or in the associated electrical system. Thus, the power steering system of this invention will always supply a lesser amount of assist whenever there is a control valve failure, and this is a failsafe failure mode, as contrasted with the failure mode of a control system which utilizes a stepper motor.

Accordingly, it is an object of the present invention to provide a control valve for controlling the flow of hydraulic fluid from a source to a hydraulically operated device having at least two inlets to selectively permit hydraulic fluid to flow to one inlet while continuously permitting hydraulic fluid to flow to another inlet, and it is a corollary object to provide a hydraulic system having such a control valve.

It is also an object of the present invention to provide a simple, reliable, failsafe control valve for controlling the flow of hydraulic fluid to a variable assist power steering valve assembly of an automotive vehicle, and it is a corollary object to provide a variable assist automotive power steering system having such a control valve.

For a further understanding of the present invention and the objects thereof, attention is directed to the drawing and the following brief description thereof, to the detailed description of the preferred embodiment, and to the appended claims.

DETAILED DESCRIPTION OF THE PREFERRED EMBODIMENT

Figure 1:
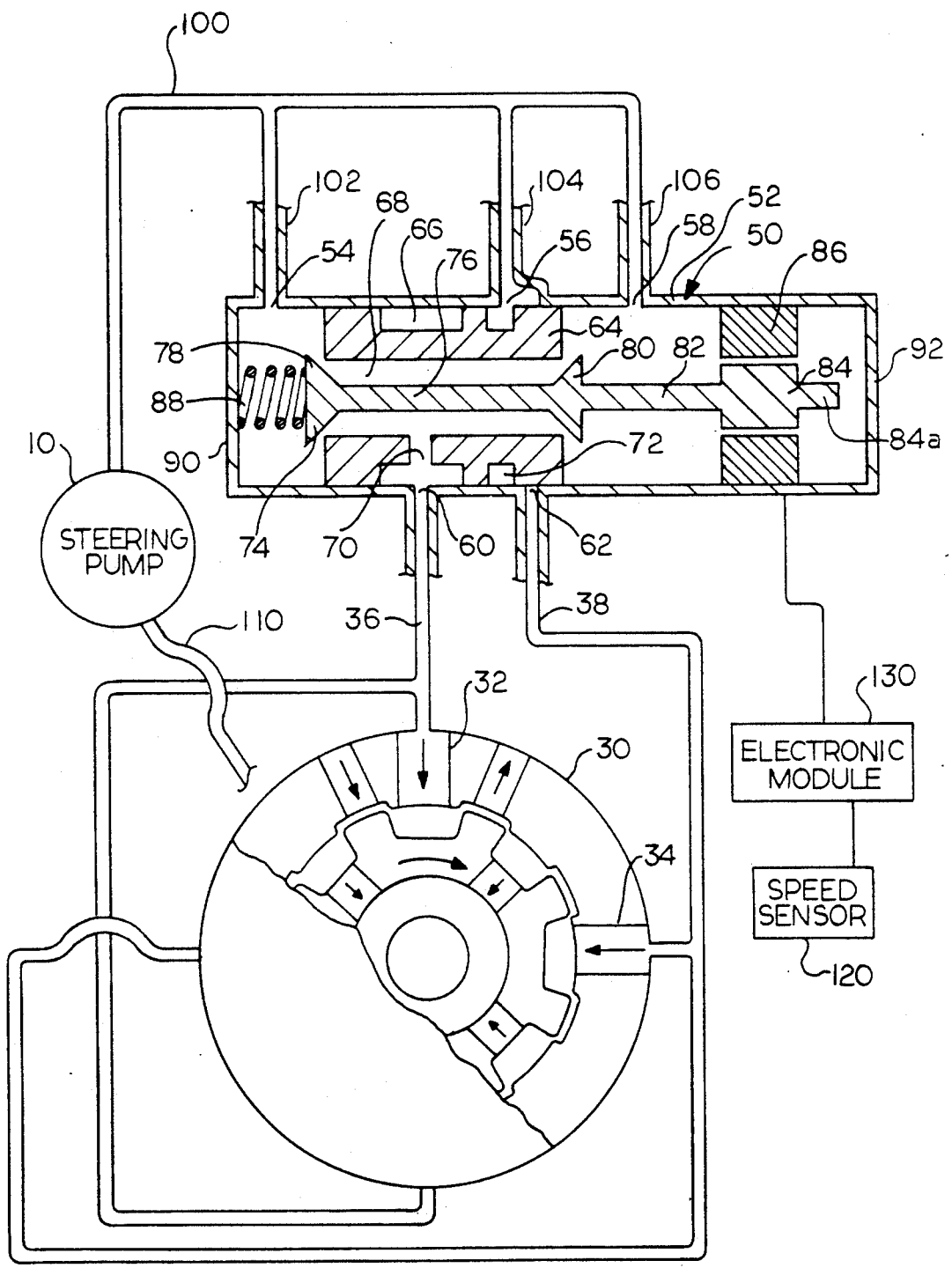
FIG. 1 is a schematic diagram of a variable assist power steering system which incorporates a control valve according to a preferred embodiment of the present invention.

A power steering system of the type illustrated in the drawing figure incorporates a hydraulic pump 10, which is preferably of the constant flow, variable pressure type. The hydraulic system further includes a power steering valve assembly 30, and a control valve 50 for controlling the flow of hydraulic fluid from the pump 10 to the valve assembly, an inlet line 100 being provided to deliver hydraulic fluid from the pump 10 to the control valve 50 and a return line 110 being provided to return hydraulic fluid from the valve assembly 30 to the pump 10.

The valve assembly 30 may be considered to correspond in construction and operation to the valve assembly 10 of U.S. Pat. No. 4,570,736, the disclosure of which is hereby incorporated by reference, and incorporates at least one first inlet 32 and at least one second inlet 34. The inlet 32 is the parking or low speed inlet, and receives hydraulic fluid from the control valve 50 through line 36. The inlet 34 is the high speed inlet and receives hydraulic fluid from the control valve 50 through a line 38 only when such flow is permitted by the operation of the control valve 50.

The control valve 50 has a generally cylindrical housing 52 and receives hydraulic fluid from the inlet line 100 through axially spaced apart openings 54, 56, 58 which directly receive hydraulic fluid through branch inlet lines 102, 104, 106, respectively. The control valve 50 also has axially spaced apart openings 60, 62 which directly communicate with the lines 36, 38, respectively. If needed or desired, the inlet lines 102 and 106 may be provided with hydraulic orifices therein, not shown, for precise control of the hydraulic pressures within the housing 50 adjacent the openings 54 and 58.

Figure 2:
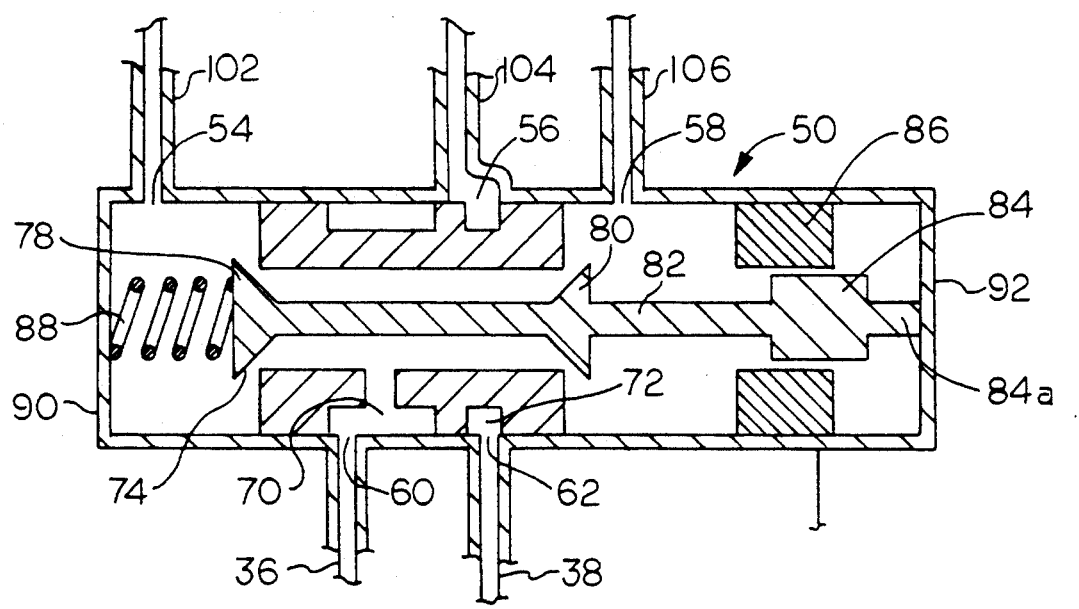
FIG. 2 is a fragmentary view which is similar to a portion of FIG. 1 and which illustrates the control valve thereof in a different operating condition.

An annular spool 64 is slidably positioned inside the housing 52. The annular spool 64 has a first peripheral groove 66 which has a substantial axial extent and which communicates with an internal passage 68 of the spool 64 through a radial passage 70. The annular spool 64 further has a second peripheral groove 72 which is axially spaced from the first groove 66 and which is of a lesser axial extent. The annular spool 64 is caused to slide to and fro within the housing 52, as will be hereinafter explained more fully, between a first position, as shown in the drawing, where there is no communication between the peripheral groove 72 and the line 38, and a second position, as illustrated in FIG. 2, where the peripheral groove 72 is in communication with the line 38. Thus, in the first position of the annular spool 64 no hydraulic fluid will flow to the second inlet 34. However, because of the greater axial extent of the first peripheral groove 66, it will be in communication with the line 36 in both positions of the annular spool, and there will be a continuous flow of hydraulic fluid to the first inlet 32 whenever the pump 10 is operating. It is to be noted that the opposed ends of the annular spool 64 are always positioned between the branch inlet lines 102 and 106 in both operating positions of the annular spool, thus permitting hydraulic fluid to continuously flow into the passage 68 through the opposed end openings in the annular spool 64.

The control valve 50 further includes a second spool 74 which has a central portion 76 positioned centrally within the internal passage 68 in the annular spool 64, thus imparting an annular configuration to the passage 68. The second spool 74 carries enlarged portions 78 and 80 which are positioned externally of the ends of the annular spool 64. The enlarged portions 78 and 80 are generally frustoconical in configuration, with apexes facing toward one another, and the spacing between the enlarged portions 78 and 80 is greater than the axial length of the annular spool, to ensure that the annular passage 68 within the annular spool 64 will always be in fluid communication with the adjacent portions of the annular valve 50. The second spool 74 carries an extension 82 at one end thereof, shown as the end which has the enlarged portion 80, and the extension 82 has an enlarged portion 84. The control valve 50 also has an annular solenoid 86 which closely surrounds the enlarged portion 84 when the second spool 74 is in the illustrated position, namely the position where the annular spool 64 is not permitting hydraulic fluid to flow into the line 38, which will be the normal operating condition of the control valve 50 when the solenoid is energized. In that regard, the second spool is normally urged to the position illustrated in FIG. 2 by a compression spring 88 which is trapped between an end 90 of the cylindrical housing 52 and the opposed enlarged portion of the second spool, namely the enlarged portion 78.

The solenoid 86 is energized only when the associated vehicle is travelling below a predetermined speed. In that regard, a speed sensor 120 is provided to sense the speed of the vehicle, and an electronic module 130 is provided to receive a high speed signal from the speed sensor 120 and to translate it into an operating signal for energizing the solenoid 86. When the solenoid 86 is energized it will linearly move the second spool to the left, in the orientation of the control valve 50 which is depicted in the drawing, against the urging of the spring 88, namely to the position which is illustrated in FIG. 1 the drawing. The annular spool 64 will follow the movement of the second spool 74 to maintain relatively balanced hydraulic fluid flow rates into the opposed ends of the passage 68, past the enlarged portions 78 and 80, and through the passage 68 into the first inlet(s) 32 by way of the radial passage 70 and the line 36.

When the vehicle which incorporates the power steering system of the drawing reaches a predetermined speed, or a predetermined state of one or more vehicle operating conditions other than or in addition to vehicle speed, the solenoid 86 will be de-energized, and the spool 74 will be urged to the right by the action of the spring 88. The annular spool 64 will thereupon move to the right, to maintain substantially equal hydraulic flow rates into the opposed ends of the passage 68, past the enlarged portions 78, 80, respectively, of the spool 74. This movement of the spool 74 to its right will bring the peripheral groove 72 into alignment with the opening 62, which will permit hydraulic fluid to flow into the high speed inlet(s) 34 of the valve assembly 30, by way of the branch line 104 and the line 38, to provide reduced power steering assist when the vehicle is in its higher speed or other operating condition(s). The movement of the spool 74 to the right is limited by a reduced diameter extension 84a of the enlarged portion 84. As shown in FIG. 2, the extension 84a bottoms against an opposite end 92 of the cylindrical housing 52 at the limit of its travel.

Because of the axial length of the peripheral groove 66, it will remain in communication with the line 36 even when the peripheral groove 72 is in communication with the line 38, to ensure continuous flow of hydraulic fluid to the inlet(s) 32 even when there is flow to the inlet(s) 34.

It is also contemplated that the control of the position of the annular spool 64 can be in more than two stages, that is, it can also be positioned so that the peripheral groove 72 is only partly in alignment with the opening 62. This condition is not illustrated in the drawing, but would result in a reduced rate of hydraulic fluid flow through the line 38 relative to the flow rate in the FIG. 2 condition of the control valve. This will permit the control valve 30 to be operated at a wider range of assist levels, whenever such a feature is needed or desired, for example, at an intermediate vehicle speed.

Although the best mode contemplated by the inventors for carrying out the present invention as of the filing date hereof has been shown and described herein, it will be apparent to those skilled in the art that suitable modifications, variations, and equivalents may be made without departing from the scope of the invention, such scope being limited solely by the terms of the following claims.

What is claimed is:

1. A control valve for controlling the flow of fluid through at least a pair of outlets, said control valve comprising:
    a generally cylindrical housing having at least three hydraulic fluid inlets spaced axially along said housing and at least two hydraulic fluid outlets spaced axially along said housing;
    an annular spool having an opposed pair of ends, said annular spool being slidable within said housing between a first position and a second position, said opposed pair of ends being between two of said at least three inlets in each of said first position and said second position, said annular spool having first internal passage means which is in fluid communication with one of said fluid outlets in each of said first position and said second position, said annular spool further having second internal passage means which is in fluid communication with another of said fluid outlets in one of said first position and said second position but not in the other of said one of said first position and said second position; and
    movement means for selectively moving said annular spool between said first position and said second position;
    wherein said annular spool is freely movable within said housing, and wherein said movement means comprises:
    a second spool, said second spool comprising:
        a central portion positioned with an opening in said annular spool and forming annular passage therewith, and
        first and second spaced apart enlarged portions connected to said central portion, the opposed ends of said annular spool being positioned between said enlarged portions, each of the opposed ends of said annular spool being open to the flow of hydraulic fluid into said annular passage past in adjacent one of said enlarged portions; and
    motive means for selectively moving said second spool to said second position.

2. A control valve according to claim 1 wherein said motive means comprises a linearly acting solenoid, and wherein said movement means further comprises resilient means biasing said second spool toward said first position upon de-energization of said solenoid.

3. A control valve according to claim 2 wherein said first internal passage means comprises a first peripheral slot in said annular spool and a radial passage extending from said first peripheral slot to said annular passage.

4. A control valve according to claim 3 wherein said second internal passage means comprises a second peripheral slot in said annular spool, said second peripheral slot being in fluid communication with a third of said inlets in each of said first position and said second position.

5. A hydraulic system having a source of hydraulic fluid, a hydraulically operated device, at least two inlets, a control valve for controlling the flow of hydraulic fluid to said at least two inlets, and conduit means for circulating hydraulic fluid from said source through said control valve to said device, said control valve comprising:
    a generally cylindrical housing having at least three hydraulic fluid inlets spaced axially along said housing and at least two hydraulic fluid outlets spaced axially along said housing;
    an annular spool having an opposed pair of ends, said annular spool being slidable within said housing between a first position and a second position, said opposed pair of ends being between two of said at least three inlets in each of said first position and said second position, said annular spool having first internal passage means which is in fluid communication with one of said fluid outlets in each of said first position and said second position, said annular spool further having second internal passage means which is in fluid communication with another of said fluid outlets in one of said first position and said second position but not in the other of said one of said first position and said second position; and
    movement means for selectively moving said annular spool between said first position and said second position;
    said means for circulating including means for delivering hydraulic fluid from said source to each of said at least three inlets of said housing of said control valve, means for circulating hydraulic fluid from one of said outlets of said housing of said control valve to one of said inlets of said device, and means for circulating hydraulic fluid from another of said outlets of said housing of said control valve to another of said inlets of said device.

6. A hydraulic system according to claim 5 wherein said annular spool is freely movable within said housing, and wherein said movement means comprises:
    a second spool, said second spool comprising;

a central portion positioned within an opening in said annular spool and forming an annular passage therewith, and first and second spaced apart enlarged portions connected to said central portion, the opposed ends of said annular spool being positioned between said enlarged portions, each of the opposed ends of said annular spool being open to the flow of hydraulic fluid into said annular passage past an adjacent one of said enlarged portions; and motive means for selectively moving said second spool toward said second position.

7. A hydraulic system according to claim 6 wherein said motive means of said control valve comprises a linearly acting solenoid, and wherein said movement means further comprises resilient means biasing said second spool toward said first position upon de-energization of said solenoid.

8. A hydraulic system according to claim 7 wherein said first internal passage means comprises a first peripheral slot in said annular spool and a radial passage extending from said first peripheral slot to said annular passage.

9. A hydraulic system according to claim 8 wherein said second internal passage means comprises a second peripheral slot in said annular spool, said second peripheral slot being in fluid communication with a third of said inlets of said cylindrical housing of said control valve.

10. A hydraulic system according to claim 9 wherein said hydraulically operated device is a variable assist power steering valve assembly for an automotive vehicle, and further comprising means responsive to one or more operating conditions of the vehicle for energizing said solenoid at a predetermined state of the one or more operating conditions.

11. A hydraulic system according to claim 10 wherein the one or more operating conditions comprises vehicle speed, and wherein said means for energizing is adapted to energize said solenoid when the vehicle speed is below a predetermined speed.

* * * * *